April 7, 1970 J. W. H. ZIJP ET AL 3,505,448
PROCESS FOR THE PREPARATION OF POLYLACTAMS
OF HIGH MOLECULAR WEIGHT
Filed April 28, 1967

Inventors
Jan W. H. Zijp
Egidius A. H. Esmer
By Cushman, Darby & Cushman
Attorneys

United States Patent Office 3,505,448
Patented Apr. 7, 1970

3,505,448
PROCESS FOR THE PREPARATION OF POLYLACTAMS OF HIGH MOLECULAR WEIGHT
Jan W. H. Zijp, Geleen, and Egidius A. H. Ernes, Beek, Limburg, Netherlands, assignors to Stamicarbon N.V., Heerlen, Netherlands
Filed Apr. 28, 1967, Ser. No. 634,624
Claims priority, application Netherlands, Apr. 29, 1966, 6605769
Int. Cl. C08g 20/12
U.S. Cl. 264—328                4 Claims

ABSTRACT OF THE DISCLOSURE

A molding method and apparatus for making shaped polylactam articles, the apparatus having a lactam monomer mixing vessel which discharges the monomer into a mold feeding device which is cooled so that the temperature of the monomer therein is maintained between the temperature of the monomer in the mixing vessel and the melting temperature of the lactam monomer. The feeding device discharges into a heated mold.

---

Figure 1:
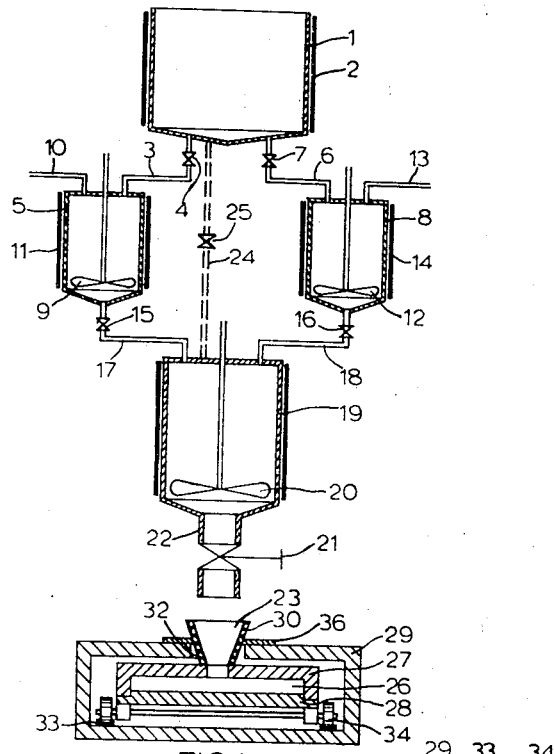

This invention relates to a method and apparatus of making shaped polylactam articles. More particularly, this invention relates to a method and apparatus for preparing molded polymerization products of high molecular weight by ionogenic or anionic catalytic polymerization of lactams whereby the outer dimensions of the molded products correspond essentially with the interior dimensions of the mold employed and whereby the molded products are substantially uniform in cross section, i.e., they essentially exhibit no shrinkage cavity at the interior thereof.

In accordance with the process of this invention a monomer is mixed in a suitable vessel with a catalyst and a promoter for accelerating the polymerization. The resulting mixture, before it has had time enough to polymerize in the mixing vessel to any appreciable extent, is transferred in the liquid phase, by means of a feeding device, to a heated mold wherein polymerization is effected.

In typical prior art procedures for the polymerization of lactams it has been observed that excessive shrinkage occurs, i.e., the volume of material transferred to the mold is considerably reduced during the process. This volume reduction obviously is disadvantageous since practically no articles of constant dimensions can be obtained when a plurality of articles are produced in the same polymerization mold. It has also been observed, in prior art procedures, that often a subatmospheric pressure is created in the mold as a result of the shrinkage of the article being molded thereby causing an introduction of air into the mold. This phenomenon effects undesirable oxidation of the molded article thereby promoting discoloration on its surface.

In an effort to overcome some of these disadvantages, it has, heretofore, been proposed to initiate the polymerization of the lactam monomer partly outside the polymerization mold so that only part of the shrinkage takes place in the mold itself. Typical prior art procedures involving an incipient polymer formation stage prior to introducing the castable mix into a mold are disclosed, for instance, in U.S. Patent 3,121,768. It has been observed, however, that in processes wherein an incipient polymer formation stage is present the viscosity of the reaction liquid often strongly increases during the pre-polymerization stage and becomes so high, due to the rapid action of the promoter employed, that the reaction liquid does not completely fill the polymerization mold.

It has now been found that the disadvantages of prior art methods of making shaped polylactam articles can be overcome, in accordance with the instant invention, by adjusting the temperature of reaction mixture being introduced into the mold to a temperature which ranges between the temperature of the mixture in the mixing vessel and the melting temperature of the monomer, which adjusted temperature is substantially lower than the wall temperature of the mold cavity. Preferably, the temperature of the reaction mixture is adjusted by removing heat from the reaction mixture feeding device employed in combination with the mold used to produce the shaped polylactam article.

As a result of employing the novel procedures of this invention, polymerization of the reaction mixture introduced into the mold is initiated not from within, as in prior art practices, but rather at the heated walls of the mold. Accordingly, the outer dimensions of the molded article correspond essentially with the inner dimensions of the mold. Any shrinkage thus caused by the polymerization of the lactam and/or the crystallization of the polymer is manifested by the formation of a shrinkage cavity remote from the mold walls and generally in the vicinity of the middle of the article being shaped. Any such shrinkage cavity, however, can easily be eliminated, when in accordance with the instant invention, the dimension of the feeding device is preselected so that its capacity for the reaction mixture contained therein is sufficiently greater than the volume of the mold being used by an amount corresponding at least to any shrinkage volume occurring during polymerization. Generally, the feeding device has a volume up to about 10 percent or even greater than the volume of the mold being employed.

In accordance with the instant invention, the reaction mixture which is initially introduced into the mold is retained only briefly in the feeding device thereby preventing any appreciable cooling thereof. As a result, only minimal additional heating need be supplied to the mold from without to polymerize this initial charge to the mold. Consequently the design of the mold and the design of the means to heat the same are greatly simplified and the time required to polymerize the reaction mixture introduced into the mold is significantly reduced. The remaining reaction mixture to be supplied during or subsequent to the polymerization of the initial charge to the mold will be retained in the feeding device or zone for a longer time. This remaining reaction mixture is therefore subjected to the cooling action of the feeding device so that it is prevented from polymerizing prematurely to such an extent that it loses its flowability characteristics. Because some shrinkage can occur during the polymerization of the reaction material in the mold generally near the center or middle portion of the mold as opposed to shrinkage at the mold walls, the remaining reaction mixture introduced into the mold gradually flows into the mold cavity and reaches an area where, as a result of the heat supplied to the mold and the exothermic polymerization reaction, the temperature therein is sufficiently high to effect polymerization of the remaining reaction mixture in a relatively short time.

As noted above, since essentially no shrinkage occurs at the mold walls the outer dimensions of the molded article are substantially equal to the internal dimensions of the mold thereby eliminating the creation of a subatmospheric pressure condition and as a result the elimination of an appreciable introduction of air into the mold. This, of course, advantageously prevents discoloration of the article and provides for the production of articles of essentially uniform size from a given mold.

Figure 2:
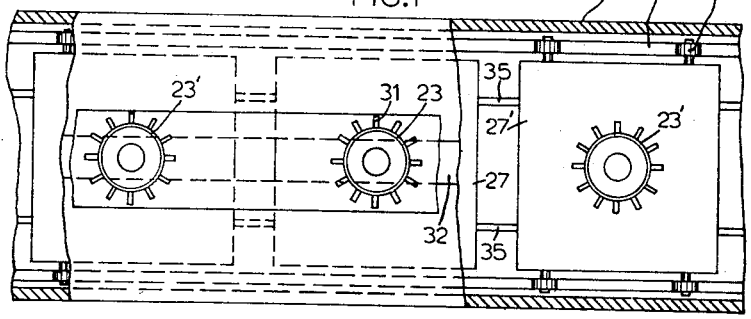

The present invention will now be further described by reference to the accompanying drawings, in which:

FIGURE 1 is a diagrammatic representation outlining one arrangement of the steps that can be employed in practicing the invention; and FIGURE 2 is a fragmentary plan view with parts broken away of the molding apparatus employed in practicing this invention.

Referring to the drawings, storage vessel 1 contains solid caprolactam in the shape of flakes, or liquid caprolactam, the latter being heated to over its melting point (69° C.) by means of heating elements 2. Part of this lactam can be passed through conduit 3 and valve 4 into a vessel 5 and another part through conduit 6 and valve 7 into a vessel 8.

In vessel 5 the lactam is mixed, by means of a stirrer 9, with a catalyst, such as potassium caprolactam, which is fed in through conduit 10. The temperature of this mixture is raised to 140–160° C. by means of heating elements 11.

In vessel 8 the lactam is mixed, by means of a stirrer 12, with a promoter, such as dicaprolactim ether, which is fed in through conduit 13. The temperature of this mixture is also raised to 140–160° C. by means of heating elements 14. The vessels 5 and 8 are preferably closed and filled with a dry inert gas, such as nitrogen or argon, to exclude the influence of the air.

Subsequently, the valves 15 and 16 in the discharge conduits 17 and 18 of the vessels 5 and 8, respectively, are opened and a predetermined amount is fed into mixing vessel 19, after which the valves 15 and 16 are closed again. In the mixing vessel 19, the lactam, the catalyst and the promotor are rapidly and intimately mixed by means of a stirrer 20, after which a valve 21 in the discharge conduit 22 of the mixing vessel 19 is opened and the contents of the mixing vessel flow into a feed hopper 23 associated with the novel molding apparatus of this invention. If so desired, the mixing vessel 19 can then be rinsed with liquid lactam which is drawn from storage vessel 1 through conduit 24 by means of valve 25, as shown by dotted lines in FIG. 1. This prevents parts of reaction mixture from being retained in the mixing vessel, where they would polymerize and might give rise to caking and plugging.

The rate at which the polymerization reaction proceeds depends on the concentration and the nature of the catalyst and the promoter and on the temperature at which the reaction is effected, on the understanding that the reaction rate increases with this concentration and/or the temperature. The amount of catalyst is usually 0.1–2 mole percent with respect to the amount of lactam to be polymerized, although larger amounts, e.g. 5–10 mole percent can also be used. The amount of promoter to be used is also small and is usually 0.05–2 mole percent with respect to the lactam. The temperature at which the polymerization is carried out can be lower when a promoter is added than when use is made of a catalyst only. Generally, a temperature of 140–170° C. is initially employed in the polymerization of ε-caprolactam. During the polymerization the temperature can rise to, e.g. 190–215° C. since the polymerization reaction is exothermic. Since the polymerization is carried out at a temperature which is lower than the melting temperature of the resulting polyamide, solid end products of high molecular weight are obtained, which have the shape of the reaction space in which the polymerization is effected.

To effect the polymerization in the mold as rapidly as possible, the reaction mixture is introduced into the mold at the highest possible temperature, so that little time is lost in further heating the mixture in the mold. On the other hand, however, the temperature of the mixture must not be so high that the mixture will appreciably polymerize outside the polymerization mold to the extent that it loses its flowability characteristics.

As the lactam is mixed with the catalyst in vessel 5 in the absence of a promoter, a liquid pre-polymerizate is obtained which can be kept at a temperature of 140–160° C. for a longer period of time, for instance 1 hour, without the viscosity becoming too high. The same is true for the mixture in vessel 8.

When the two mixtures of vessels 5 and 8 are added together in the mixing device 19, the polymerization reaction is considerably accelerated and the resulting mixture in vessel 19 remains pourable for a relatively short period of time, e.g. 4–5 minutes. This time, however, is amply sufficient to properly mix the amounts drawn from vessels 5 and 8 and to cause the resulting mixture to flow into feed hopper 23. The amount of the resulting mixture transferred from vessel 19 to the mold feeding zone, i.e. feeding device 23 is at least sufficient to completely fill the mold and to compensate for any shrinkage that can occur in the polymerization reaction.

In vessels 5 and 8 other ingredients, e.g. fillers, such as pigments, softeners, antioxidants, etc. can also be added. Moreover, it is possible to mix the total amount of lactam required with the catalyst or the promoter in one of the vessels and to add the other of these reaction components in the mixing device 19.

The reaction mixture flows from feed hopper 23 into molding cavity or space 26, which is enclosed by two mold halves 27 and 28. The two mold halves should be so sealed with respect to each other that the liquid mixture cannot escape between the abutting faces. Provision should also be made so any gas, especially when the process is carried out in a gaseous atmosphere, such as nitrogen, can escape from the mold when the reaction mixture flows in. To this end, risers (not shown) can be provided in suitable places or the feed hopper 23 can be connected to the highest point of the mold, so that the air or any other gas can escape through the hopper.

The mold is placed in a furnace 29, e.g. an electric furnace, which is maintained at a temperature that is higher than that of the reaction mixture introduced therein. Preferably the temperature of the furnace is maintained between 165–170° C. although the choice of temperature obviously will depend, for instance, on the particular lactam being polymerized. Consequently, the walls of the mold also assume this temperature. When the reaction mixture entering the mold comes into contact with these heated walls, polymerization of this mixture will be initiated at these walls. Because the reaction is exothermic some polymer formed may initially dissolve in the reaction mixture. However, since the melting temperature of the polyamide is generally about 215–225° C., the polymer will form against the mold walls at increasing concentration and solidify inwardly towards the center thereof. As the amount of lactam transferred to the feed hopper 23 is larger than the volume of the molding space by an amount up to about 10%, or even greater, the additional volume corresponding to any shrinkage caused in the polymerization, no shrinkage cavity will be formed in the middle of the article when the polymerization proceeding towards the center has been completed.

The reaction mixture transferred to the hopper 23 virtually immediately flows into the mold, except the additional amount to compensate for any shrinkage. The latter amount is retained in the hopper and cannot flow into the mold until the amount of reaction mixture corresponding to the volume of the mold has polymerized thereby creating, if any, any shrinkage cavity near the middle thereof. The hopper 23 is surrounded by cooling means such as a spiral cooler 30, through which a cooling medium, such as water, circulates. Thus that portion of the reaction mixture which is retained in the hopper 23 can be cooled to a temperature ranging between the temperature of the essentially lactam monomer mixture in vessel 19 and the melting temperature of said lactam monomer. In this example, where caprolactam is employed, the temperature in the feeding device can be thus maintained, between about 75–135° C., preferably about 130° C. This particular intermediate temperature, of course, will be dependent, for instance, on the initial lactam monomer chosen as well as the temperature observed in the mixing vessel 19. As a result, the polymerization reaction in the hopper 23 is retarded, so that the reaction mixture will remain flowable to such an extent that it can flow freely into the mold to compensate for the shrinkage, if any.

Since at least a portion of the feed hopper 23 extends outside the furnace, there will of course also be some atmospheric cooling. In many cases this atmospheric cooling suffices to maintain the temperature of the reaction mixture in the hopper 23 sufficiently to retard the polymerization reaction. In this case the spiral cooler 30 can be omitted. If so desired, the feed hopper 23 can also be provided on the outside surface thereof with cooling ribs 31, as indicated in FIG. 2.

The feed hopper 23 extends through an opening 32 in the top of the furnace 29. This opening 32 can be a slot extending parallel to the length of the furnace. A plurality of molds 27, 27' can then be so placed in the furnace that they can be moved, for example, by means of a pair of wheels 34 along rails 33 or any other suitable conveying means. In the embodiment shown in FIG. 2 the molds are connected by means of coupling members 35, so that, by means of a suitable mechanism, their associated feed hoppers 23, 23' can be placed sequentially under the outlet opening of the mixing vessel 19. The furnace 29 can be oblong in shape and can be so designed that the molds successively pass a pre-heating zone, the filling zone, and a cooling zone. After leaving the furnace 29, the molds are opened and the molded article is removed. The molds can then be closed again and returned to the entrance of the furnace. To this end the molds can be so coupled that they form an endless chain. The hoppers 23, 23' are provided with sealing strips 36, which seal off the top side of the slot-shaped opening 32 of the furnace. Wtih this arrangement an amount of lactam is prepared in the mixing device 19 as is sufficient for filling a predetermined number of molds. It is also possible to make the mixing vessel 19 movable, so that molds placed side by side in the furnace can be filled sequentially.

It is to be understood that the invention disclosed herein is not restricted to the specific description above. In general the invention can be used in the polymerization of cyclic amides, such as caprolactam, oenantholactam, caprylolactam, decanolactam, undecanolactam, dodecanolactam, pentadecanolactam, hexadecanolactam, methyl cyclohexanone isoximes, cyclic hexamethylene adipamide, and the like, and also mixtures thereof, in the presence of an inorganic catalyst. Representative catalysts include lactam metal compounds containing a metal atom bound to the nitrogen atom of the lactam, for instance sodium caprolactam and potassium caprolactam. There can also be used substances from which such lactam metal compounds form by reaction with the lactam, e.g. metal alkyl compounds, such as diisobutyl aluminum hydride, triethyl aluminium, triisopropyl aluminum, diethyl zinc, and compounds of these metals giving an alkaline reaction, such as hydrides, oxides, hydroxides, alcoholates, and carbonates, and also Grignard compounds, such as alkyl magnesium bromide and aryl magnesium bromide.

Typical substances that can be used as a promoter include nitrogen compounds, such as isocyanates, carbodiimides, cyanamides, and, in general, compounds with a tertiary nitrogen atom bound to carbonyl, thiocarbonyl, sulphonyl, or nitroso groups, and also diimide ethers, such as dicaprolactam ether.

The ratio in which the various reaction components are used depends on the time available, which, in turn, can be determined by the size and the shape of the article to be molded. In the following Table I, there is shown representative times needed for the polymerization of ε-caprolactam depending on the amount by weight of biscaprolactim ether as promoter, the weight of potassium hydroxide as a catalyst, and on various reaction temperatures.

This table shows that, for instance, a polymerization liquid containing 0.3 mole percent of dicaprolactam ether and 0.6 mole percent of KOH polymerizes in a mold having a temperature of 170° C. in 3 minutes and, at 185° C., even in 1 minute. At a temperature of 140° C., however, the time needed for polymerizing this mixture is 25 minutes. This shows that, by cooling the feed hopper 23, the polymerization of the material in the hopper can be sufficiently retarded until the shrinkage taking place in the polymerizate allows the material to flow into the mold.

TABLE I

| Dicaprolactim ether, mole percent | KOH, mole percent | Temperature, ° C. | Polymerization Time, min. |
|---|---|---|---|
| 0.1 | 0.6 | 150 | 50 |
| 0.1 | 1.5 | 150 | 19 |
| 0.1 | 1.5 | 170 | 12 |
| 0.1 | 1.5 | 185 | 9 |
| 0.1 | 2.4 | 150 | 21 |
| 0.3 | 0.1 | 150 | 22 |
| 0.3 | 0.6 | 140 | 25 |
| 0.3 | 0.6 | 150 | 12 |
| 0.3 | 0.6 | 170 | 3 |
| 0.3 | 0.6 | 185 | 1 |
| 0.3 | 2.4 | 150 | 12 |
| 0.6 | 0.6 | 140 | 13 |
| 0.6 | 0.6 | 150 | 8 |
| 0.6 | 0.6 | 170 | 2½ |
| 0.6 | 0.6 | 185 | 1 |
| 0.6 | 1.5 | 140 | 14 |
| 0.6 | 1.5 | 150 | 5 |
| 0.6 | 1.5 | 170 | 4 |
| 0.6 | 1.5 | 185 | 2 |
| 0.6 | 2.4 | 150 | 5 |
| 1.2 | 0.6 | 150 | 8½ |
| 1.2 | 1.5 | 150 | 4 |
| 1.2 | 2.4 | 150 | 4 |

What is claimed is:

1. In a process for preparing polymerization products of high molecular weight by anionic catalytic polymerization of a lactam monomer having at least 6 carbon atoms in the lactam ring wherein the monomer is mixed with a catalyst and a promoter for accelerating the polymerization thereof in a mixing vessel and the resulting essentially lactam monomer mixture, before it has had sufficient time to polymerize in said mixing vessel to any appreciable extent is transferred in the liquid phase to a mold through a feeding device associated therewith in a zone maintained at the temperature at which the rapid polymerization of said lactam monomer will be initiated, the improvement comprising initially heating said lactam monomer mixture in said mixing vessel above the melting temperature of said lactam monomer but below and near the temperature at which the rapid polymerization of the lactam monomer will be initiated, transferring said heated lactam monomer mixture through said feeding device and introducing initially an amount of said heated lactam monomer into said mold to substantially fill said mold, the volume of said heated lactam monomer being transferred being appreciably greater than the volume of said mold with the amount of heated lactam monomer which exceeds the volume of said mold being retained in said feeding device and corresponding substantially to the shrinkage volume which takes place during polymerization in said mold, cooling the heated lactam monomer mixture retained in said feeding device to a temperature at which substantially no polymerization takes place but above the melting temperature of said lactam monomer and introducing said retained excess lactam monomer mixture into said mold to fill said shrinkage volume caused by polymerization of the initially introduced lactam monomer mixture.

2. The process of claim 1 wherein the amount of said mixture transferred is at least up to about 10% greater than the volume of said mold.

3. The process of claim 1 wherein the lactam monomer is caprolactam.

4. The process of claim 3 wherein said lactam monomer mixture in said mixing vessel is initially heated to a temperature ranging between 140–160° C., said zone housing said mold is maintained at a temperature of 165–170° C. and said excess lactam monomer mixture retained in said feeding device is cooled to a temperature between 75–135° C.

References Cited

UNITED STATES PATENTS

| 3,121,768 | 2/1964 | Boyer | 260—78 |
| 3,141,006 | 7/1964 | Kohan | 260—78 |
| 3,200,095 | 8/1965 | Wichterle et al. | 260—78 |
| 3,294,757 | 12/1966 | Church | 260—78 |

HAROLD D. ANDERSON, Primary Examiner

U.S. Cl. X.R.

260—78; 264—327, 331